United States Patent [19]

Leuner et al.

[11] Patent Number: 4,476,913
[45] Date of Patent: Oct. 16, 1984

[54] ARRANGEMENT FOR PRESSURE WELDING OF A ROLLING BEARING CAGE

[75] Inventors: Hilmar Leuner, Üchtelhausen; Herbert Dobhan, Bergrheinfeld; Bernhard Bauer, Hassfurt; Armin Olschewski, Schweinfurt, all of Fed. Rep. of Germany

[73] Assignee: SKF Kugellagerfabriken GmbH, Schweinfurt, Fed. Rep. of Germany

[21] Appl. No.: 428,731

[22] Filed: Sep. 30, 1982

[30] Foreign Application Priority Data

Oct. 23, 1981 [DE] Fed. Rep. of Germany ...... 3142047

[51] Int. Cl.³ .............................................. B22D 29/00
[52] U.S. Cl. ..................................... 164/346; 249/60; 249/64; 425/438; 425/DIG. 58
[58] Field of Search ............ 249/60, 64; 425/438, 425/DIG. 58; 164/344, 346, 137

[56] References Cited

U.S. PATENT DOCUMENTS 1,019,905 3/1912 McKee et al. .................. 164/346 X
2,808,628 10/1957 Fouron et al. ...................... 164/346
2,948,031 8/1960 Webb .............................. 164/346 X
4,362,687 12/1982 Olschewski et al. ............... 264/318
4,383,670 5/1983 Olschewski et al. ............ 264/318 X

FOREIGN PATENT DOCUMENTS 1729327 6/1971 Fed. Rep. of Germany .

Primary Examiner—Nicholas P. Godici
Assistant Examiner—P. Weston Musselman, Jr.
Attorney, Agent, or Firm—Daniel M. Rosen

[57] ABSTRACT

Arrangement for the die casting of a roller bearing cage having pockets for the rolling bodies includes an outer housing covering the die casting mold and having guide openings opening at the central planes of the respective pockets and main and auxiliary slides arranged side by side in each guide opening. The main and auxiliary slides have guiding surfaces at their inner ends directed at an angle to the central plane, the guiding surfaces being laterally opposite one another and supporting one another. Each auxiliary slide has a lateral bulge on the side thereof opposite the guiding surface of the guide opening for defining a lateral limit wall of the pocket with holding projections for the rolling bodies on the inner and outer edges. The arrangement in accordance with the invention requires few components, provides a compact construction, and is economically produceable. The main slides are each operable from the exterior of the apparatus, and have recesses with inner and outer shoulder surfaces. The respective auxiliary slides have holding lugs extending into the recesses of the respective main slide between the inner and outer shoulder surfaces thereof with play. The auxiliary slides further have support surfaces on the sides thereof opposite the holding lugs with an outer edge running along the boundary wall of the corresponding pocket and supported on the wall of the guide opening of the housing, the auxiliary slide being arranged to be tiltable in the guide opening about the boundary edge.

10 Claims, 6 Drawing Figures

ARRANGEMENT FOR PRESSURE WELDING OF A ROLLING BEARING CAGE

This invention relates to an arrangement for the die casting of a rolling bearing cage.

An arrangement for the die casting of rolling bearing cages is known in which the main slide and consequently also the auxiliary slide are removed laterally from the die casting form in the direction of the central plane of the respective pockets, following the die casting or injection molding process (DE-AS No. 2 949 251). The control of the time of the mutual completions of movement of the main and auxiliary slides of each pocket must be effected, in the arrangement described therein by additional control elements.

Another arrangement for the die casting of a rolling bearing is described in DE-OS No. 1 729 327, in which the auxiliary slide is mounted to be rotatable about the axis of the housing. In this arrangement a spring element alone is provided for automatically turning the auxiliary slides from the corresponding pocket after die casting, so that many control elements, which increase the cost of production, are employed.

The present invention is therefore directed to the provision of an improved arrangement for the die casting of the rolling bearing cage, of the above type, having a minimum number of elements, and a compact construction, and being economical to provide.

In the embodiment of a die casting arrangement in accordance with the invention, each main slide is first pulled radially outward from the die casting form with respect to the auxiliary slide, in the process of withdrawing the slide, so that the main slide effects a turning movement of the auxiliary slide with respect the main slide, the auxiliary slide also being titled with respect to the guide opening. The bulge or projection provided on the inner end of the auxiliary slide is rotated in the direction of the center plane of the pocket between the inner and outer holding projection of the boundary walls of the respective pocket. Upon further withdrawal of the main slide, the auxiliary slide is carried with the main slide by its holding lug, and withdrawn outwardly from the die casting mold in the direction of the central plane, in its rotated condition. After this common withdrawal of the main slide and auxiliary slide from each pocket, the die cast cage is no longer held, and the cage can thus accordingly be axially pushed from the die casting mold using a conventional ejector or the like. Since the completion of movement of the main and auxiliary slide is automatically controlled during the withdrawal thereof from the die casting mold, no additional elements are generally needed for controlling the mutual movements of the main and auxiliary slides.

It is only necessary to provide a few wear resistant sliding surfaces between the main and auxiliary slides, so that the arrangement in accordance with the invention may have a compact construction and a relatively long operating life.

In the arrangement in accordance with the invention the boundary edge, about which the auxiliary sleeve is tilted in the withdrawal of the main slide, has an obtuse angle in its cross-section, so that it does not scratch the lateral supporting walls of the guide opening of the housing under loads. Due to its tilted movement, the auxiliary slide can be withdrawn from the guide casting form while overcoming relatively small slipping displacement force.

Further, in accordance with the invention, each auxiliary slide is held free of play between its boundary edge and the laterally opposite facing surface of the holding lug.

Further in accordance with the invention the inclined guide surfaces of the main and respective auxiliary slides are forcefully held against one another upon insertion of the main slide, and the auxiliary slide is rotated back about its boundary edge to its original position for die casting. Upon further insertion of the main slide the outer shoulder surface of the recess of the main slide engages the outer contact surface of the auxiliary slide, so that the main slide is moved from the outside to the inside of the die casting mold along with the tilted back auxiliary slide. The supporting surfaces of the main and auxiliary slides are thereby slidingly guided on the wall of the guide opening.

In order that the invention will be more clearly understood it will now be disclosed in greater detail with reference to the accompanying drawings, wherein.

Figure 1:
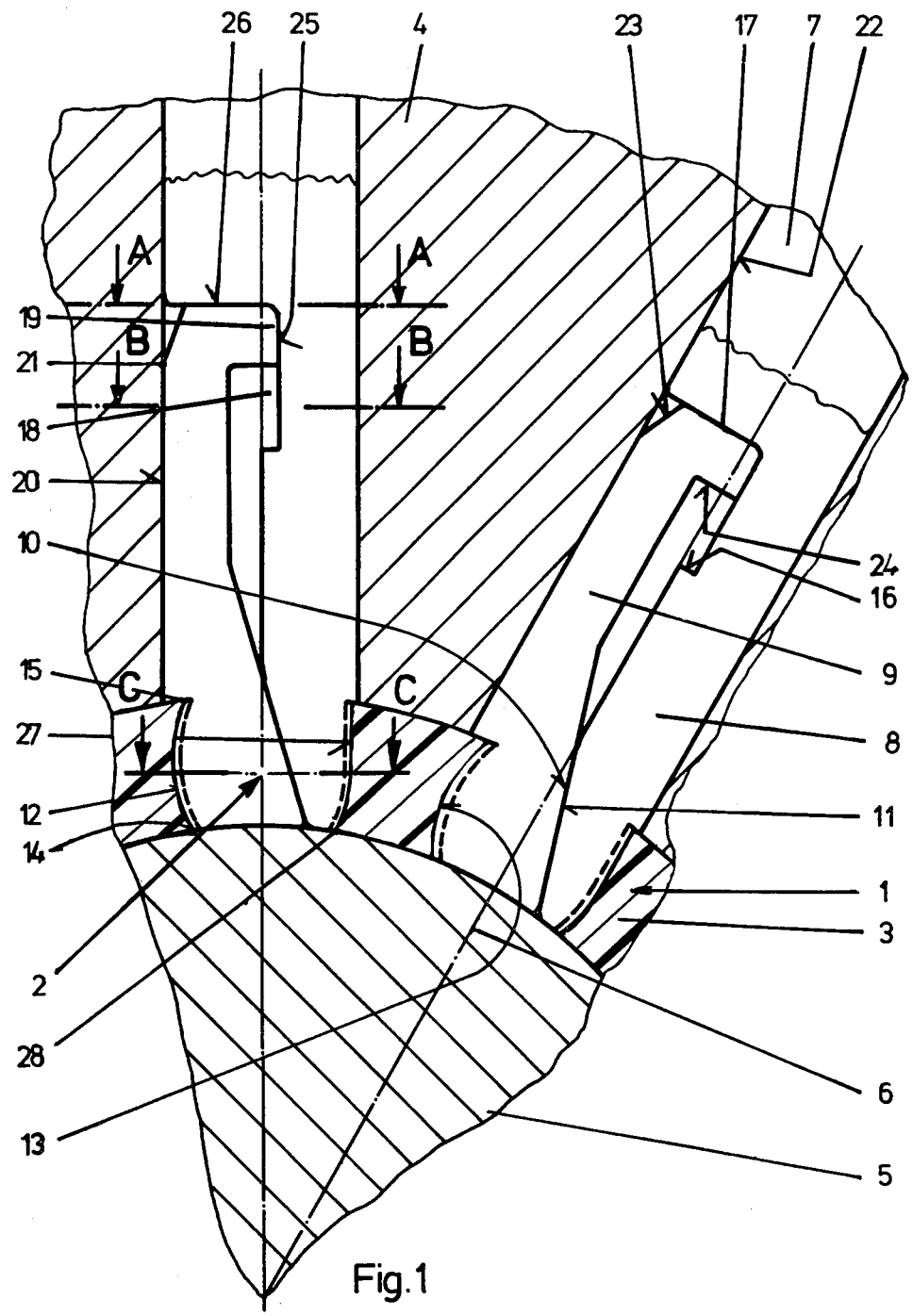
FIG. 1 is a cross-sectional view of a portion of an arrangement for die casting of a rolling bearing cage in accordance with the invention, with the main and auxiliary slides in the radial innermost position.

Referring now to FIG. 1, the reference numeral 1 refers to a die casting mold having an annular shape for the production, in present case, of a sleeve shaped rolling body cage 3 with pockets 2 distributed about its circumference, from a die casting material such as plastic. The die casting mold 1 is covered radially outwardly by a housing 4, and radially inwardly by a cylindrical insert 5.

A guide opening 7 opens into each pocket 2 of the rolling bearing cage 3 of the die casting mold 1. The guide opening lies in a central plane 6 of the respective pocket 2, the guide opening 7 extending radially outwardly through the housing 4. A main slide 8 and a corresponding auxiliary slide 9 are assembled adjacent one another in each of the guide openings 7 of the housing 4. The main slide 8 and the corresponding auxiliary slide 9 each has a guide surface 10, 11 adjacent its inner end and extending at an angle to the central plane 6, the guide surfaces 10, 11 being facing and closely supporting one another in the die casting mold 1 (FIG. 1).

Each auxiliary slide 9 has a lateral projection or bulge 12 on the side thereof opposite the guide surface 11, the bulge 12 closely fitting the curved contour of the rolling body (not shown) which in the illustrated case, is in the form of a self aligning roller. Due to the provision of the bulges 12 on each auxiliary slide 9, a holding projection 14, 15 for the rolling bodies of the rolling bearing cage 3 is formed on the inner and outer edges of the boundary wall 13 during the die casting of the boundary wall 13 of the pocket 2. The rolling bodies are forced between the outer holding projection 15 of the pocket 2 and the boundary wall lying opposite the boundary wall 13 of the pocket 2, during the assembly of the rolling bodies in the respective pockets 2 of the rolling bearing cage 3, and are thus snapped into the pocket 2.

Each main slide 8 is slideably displaceably arranged on the wall of its guide opening 7 for movement into and out of the die casting mold 1. For this purpose a known operating device (not shown) is provided engaging the radial outer end of the main slide 8.

In addition, each main slide 8 has a lateral recess 18 on the side wall thereof toward the respective auxiliary slide 9, the recess 18 having a radially inner shoulder surface 16 and a radially outer shoulder surface 17. The respective auxiliary slide 9 has a holding lug 19 on the side thereof toward the main slide 8, the lug 19 engaging the recess 18 between the inner shoulder surface 16 and the outer shoulder surface 17 with radial play. The auxiliary slide 9 has a support surface 20 with an outer boundary edge 21 on the side thereof opposite the holding lug 19. This outer boundary edge 21, which is supported on the wall 22 of the guide surface 7, extends in a straight line parallel to the central plane 6.

The flat supporting surface 20 of the auxiliary slide 9 extends parallel to the central plane 6 of the pocket 2. The outer boundary edge 21 of the support surface 20 is formed by a flat chamfer 23 that is directed outwardly at an angle to the central plane, the chamfer being at the outer end of the auxiliary slide 9.

The boundary edge 21 supports itself on the wall 22 of the guide opening 7 of the housing 4. It extends consequently along the boundary wall 13 of the corresponding pocket 2 of the rolling bearing cage 3.

Figure 2:
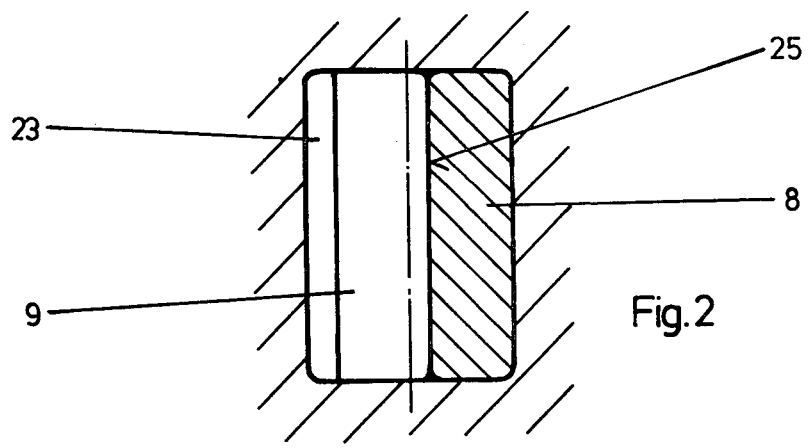
FIG. 2 is a cross-sectional view of a portion of the arrangement of FIG. 1 taking along the line A—A.
Figure 3:
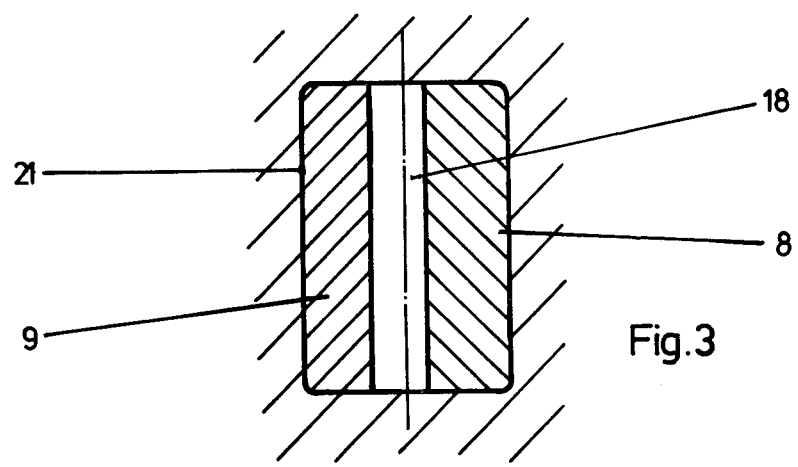
FIG. 3 is a cross-sectional view of a portion of the arrangement of FIG. 1 taken along the lines B—B.

The holding lug 19 of each adjacent slide 9 has an inner contact surface 24 directed toward the inner shoulder surface 16 of the recess 18 as well as a facing surface 25 joined to the end thereof, the facing surface 25 being on the side of the adjacent slide 9 toward the main slide 8. The edge transition between the engagement surface 24 and the facing surface 25 is slideably displaceably arranged in the bottom of the recess 18 of the main slide 8 in the inward and outward extending direction. These edge transitions lie laterally opposite the boundary edges 21 of the support surface 20 of the auxiliary slide 9, on the opposite side of the central plane 6. In the above described embodiment the edge transition is directed parallel to the boundary edge 21, and the cross-section of each guide opening 7 of the housing 4 has a rectangular shape, as is especially apparent in FIGS. 2 and 3. Each auxiliary slide 9 has an outer contact surface 26 directly opposite the outer shoulder surface 17 of the recess 18 of the main slide 8.

Figure 4:
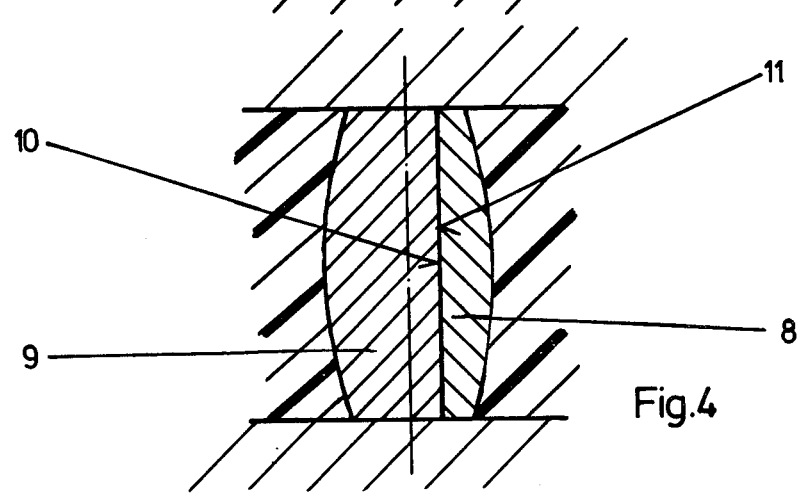
FIG. 4 is a cross-sectional view of a portion of the arrangement of FIG. 1 taken along the lines C—C.

As illustrated especially in FIGS. 1 and 4, the mutually facing supporting flat guiding surfaces 10, 11 which extend in a plane inclined to the central plane, tightly engage one another in the radially inward position of the main slide 8 and the corresponding auxiliary slide. The boundary wall 27 laterally opposite the boundary wall 13 of pocket 2 has a holding projection 28 for the rolling bodies projecting into the pocket 2 only on it inner edge. As a result the main slide 8 can be withdrawn without hinderance radially outwardly from the die casting mold 1 along the central plane 6 after the die casting, the main slide being slidingly guided by the respective guide opening 7.

Figure 5:
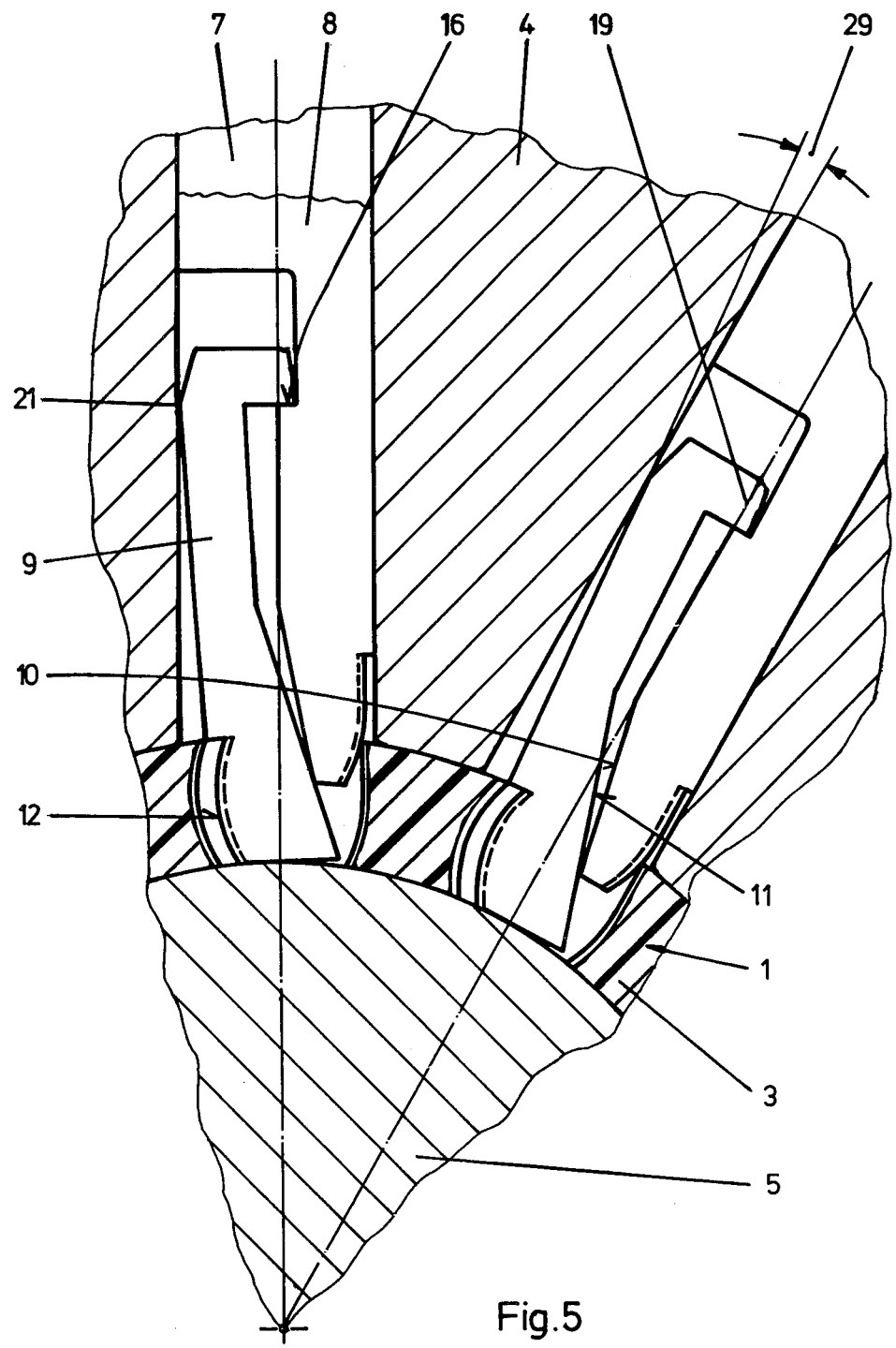
FIG. 5 is a cross-sectional view of the arrangement for die casting the rolling bearing cage in accordance with the arrangement of FIG. 1, wherein the main slide is partially withdrawn.

In withdrawing the main slide 8, the main slide is first pulled radially outwardly, opposite the respective auxiliary slide 9, until its inner shoulder surface 16 engages the inner contact surface 24 of the auxiliary slide 9. Thereupon the auxiliary slide is carried on its contact surface 24. Upon further withdrawal of the main slide 8 the auxiliary slide is pivotted slightly about the angle 29 on its boundary surface 21 inside of the guide opening 7. (FIG. 5) The auxiliary slide 9 contacts the utmost inner rim of the opposite guide surface 10 of the main slide 8 with its inclined guide surface 11 upon this rotation. The auxiliary slide 9 is turned out of the pocket 2 with its bulge 12 between the two holding projections 14, 15 of the boundary walls 13 of the pocket 2.

Upon the further withdrawal of the main slide from the die casting mold 1, the auxiliary slide 9 is finally carried with its holding lug 19 on the main slide 8 and pulled radially out of die casting mold 1, in the rotated condition. As a consequence the boundary 21 of the auxiliary slide slides along the wall of the guiding opening 7.

After the two slides, i.e., the main slide 8 and the auxiliary slide 9, have been completely removed from the pocket 2 of the die casting mold 1, the prepared rolling bearing cage can be pushed out axially from the die casting mold 1 in known manner.

Figure 6:
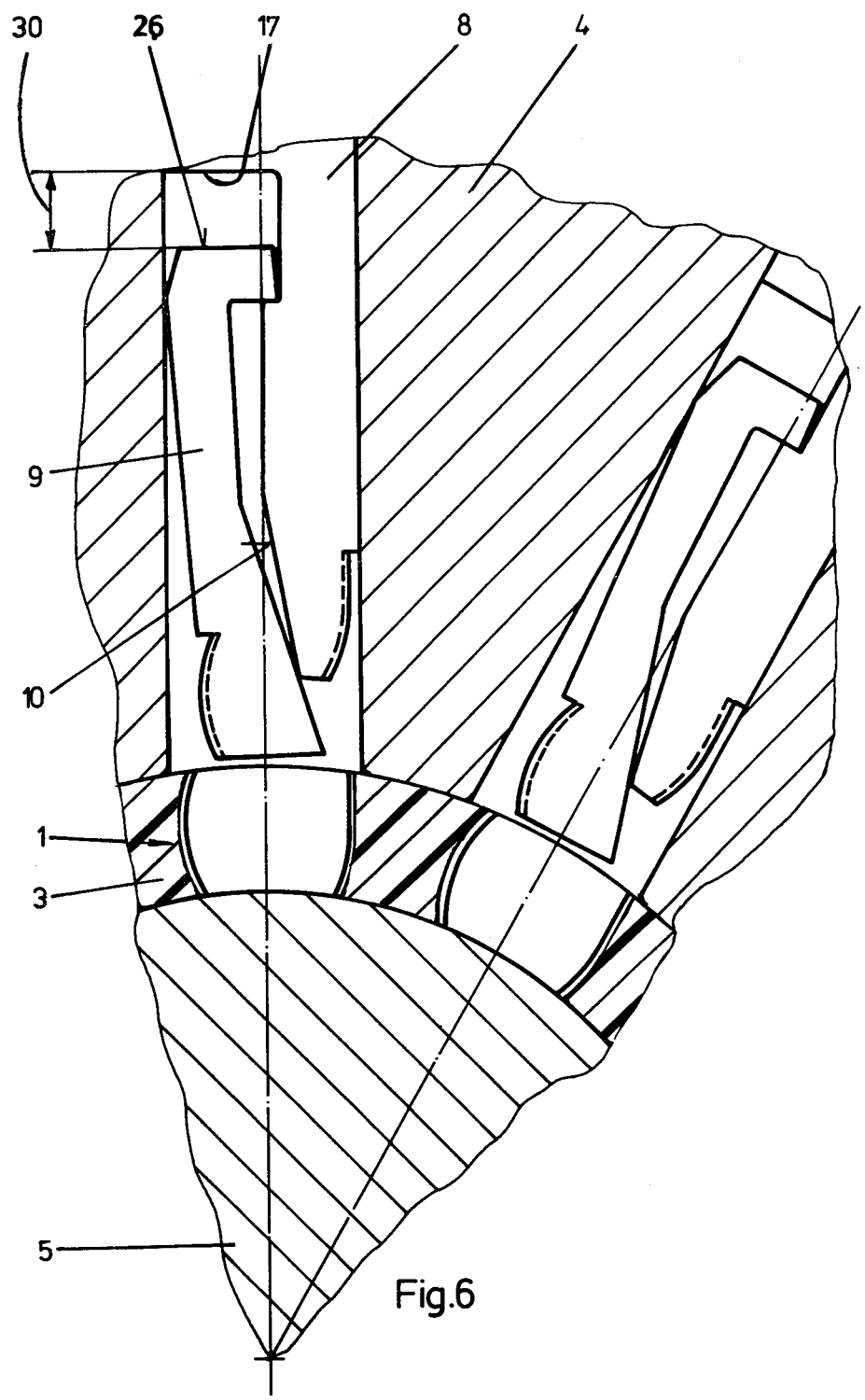
FIG. 6 is a cross-sectional view corresponding to FIG. 1 wherein the main and auxiliary slide are fully withdrawn from the die casting mold.

Upon once again inserting the main slide 8, initially only the main slide 8 slidingly moves in the guide opening 7 in the direction of the die casting mold 1, until its outer shoulder surface 17 contacts the radially opposite outer contact surface 26 of the auxiliary slide 9. As a consequence the radial play 30 between the shoulder surface 17 and the contact surface 17 illustrated in FIG. 6 is traversed. The guide surface 11 of the auxiliary slide 9 is forcefully contacted by the inner edge of the inclined guide surface 10 of the main slide 8 opposite thereto, thus rotating the auxiliary slide back through the angle 29 (see FIG. 5).

Upon the further insertion of the main slide 8, the main slide 8 and also the respective auxiliary slide 9 are inserted in common in the die casting mold 1, so that the inner facing surfaces of the main and auxiliary slides 8, 9 finally tightly contact the cylindrical insert 5 (FIG. 1).

The arrangement for die casting of a rolling bearing cage as described above can be structurally modified within the scope of the invention. Thus, for example, the bulges 12 of the auxiliary slide can have any desired form for fitting the contour of the rolling bodies. The rolling bearing cages can thus be produced by the corresponding shaping of the bulges of the auxiliary slides and of the end of the main slides engaging the die casting mold, when the rolling bodies have a cylindrical form (cylindrical rollers), a tapered form (tapered rollers) or a spherical form (balls).

In addition the die casting mold need not be annular or curved. The die casting mold can thus have a rectilinear form for the production of strip or bar shaped rolling bearing cages for lengthwise moving rolling bearings.

What is claimed is:

1. In an arrangement for die casting of a rolling bearing cage having pockets for rolling bodies, in a die casting mold, wherein a housing is provided covering a die casting mold, the housing having guide openings opening in the central plane of the respective pockets of the die casting mold, main and auxiliary slides being arranged side by side in each guide opening, the main and auxiliary slides having laterally facing supporting guide surfaces at their inner ends inclined to the central planes, each auxiliary slide having a lateral bulge on the side thereof opposite the guide surface, for forming one of the lateral boundary walls of the pockets with holding projections on inner and outer edges thereof for the rolling bodies, the improvement wherein each main slide is externally operable and has a recess on the side thereof toward the respective auxiliary slide, the recess having a radially inner shoulder and a radially outer shoulder, the auxiliary slide having a holding lug extending into the recess between said inner shoulder and outer shoulder with radial play, the auxiliary slide having a supporting surface on the side opposite the lug with a radial outer boundary edge, said supporting surface extending along the boundary wall of the respective pocket and being supported on the wall of the guide opening, the auxiliary slide being pivotable about said outer boundary edge in the guide opening.

2. The arrangement of claim 1, wherein the supporting surface of the auxiliary slide extends parallel to the central plane of the corresponding pocket and the outer boundary edge of the support surface is formed by an outwardly directed chamfer or rounding on the radial outer end of the auxiliary slide.

3. The arrangement according to claim 1 wherein the holding lug of each auxiliary slide has an inner contact surface directly radially overlying the inner shoulder surface of the recess of the main slide, a facing surface being joined to the inner contact surface, the edge transition between the inner contact surface and the facing surface being slidingly displaceable in the inner and outer direction in the bottom of the recess parallel to the central plane on the side of the auxiliary slide toward the main slide, and the boundary edge of the supporting surface of the auxiliary slide is positioned laterally opposite said edge transition.

4. The arrangement according to claim 1, wherein each auxiliary slide has an outer contact surface directly radially underlying the outer shoulder surface of the recess of the main slide for contacting the outer shoulder surface with this outer contact surface during the insertion of the main slide in the die casting form.

5. In a die casting apparatus for die casting a cage for rolling bearings, wherein the die casting apparatus includes a mold, a housing on one side of a mold, the housing having guide openings extending therethrough, a main slide and an auxiliary slide being slideably guided in each of said guide openings to extend into said mold and having first ends thereon shaped to form a pocket in said cage, the improvement wherein said main slide is shaped to be guided in said guide opening to move in a straight direction into and out of said mold, said main slide having a lateral recess with inner and outer shoulders, with respect to said mold, said auxiliary slide having a lug extending into said recess with a dimension parallel to said direction that is less than the distance between said shoulders, said auxiliary slide being tiltable in said guide opening whereby upon withdrawal of said main slide from said mold, said inner shoulder engages said lug to tilt said auxiliary slide in said guide opening for withdrawal from said mold in common with said main slide.

6. The die casting apparatus of claim 5 wherein the lateral facing sides of said main and auxiliary slides at said first end are flat and inclined at the same angle to said direction, said flat inclined sides being in contact with one another when said outer shoulder engages said lug, said inclined side of said auxiliary slide underlying said lateral inclined side of said main slide.

7. The die casting apparatus of claim 6 wherein the lateral sides of said main and auxiliary slides facing one another between said inclined sides and said lug of said auxiliary slide are laterally spaced apart, whereby said auxiliary slide can tilt in said opening when said lug is out of engagement with said upper shoulder.

8. The die casting apparatus of claim 7 wherein the lateral side of said auxiliary slide away from said main slide is shaped to slide on the walls of said guide opening when forced inwardly toward said mold by contact of said outer shoulder and said lug, said last mentioned lateral side of said auxiliary slide defining an outer transverse edge laterally opposite said lug, whereby said auxiliary slide is pivotable about said transverse edge when said lug is out of contact with said outer shoulder.

9. The die casting apparatus of claim 8 wherein said auxiliary slide extends outwardly of said transverse edge to define a chamfered or rounded second end of said auxiliary slide.

10. The die casting apparatus of claim 5 wherein said first end of said auxiliary slide is shaped to define projections at the inner and outer edges of said cage, said first end of said main slide being shaped to define a projection only at the edges of said cage away from said housing, whereby said main slide may be withdrawn in said direction from said mold.

* * * * *

UNITED STATES PATENT AND TRADEMARK OFFICE
CERTIFICATE OF CORRECTION

PATENT NO. : 4,476,913
DATED : October 16, 1984
INVENTOR(S) : LEUNER, ET AL

It is certified that error appears in the above-identified patent and that said Letters Patent is hereby corrected as shown below:

```
For the title delete "PRESSURE WELDING" and insert
-- DIE CASTING --.

Column 1, line 37, delete "titled" and insert
-- tilted --.

Column 1, line 36, after "respect" insert -- to --.

Column 3, line 61, delete "it" and insert -- its --.
```

Signed and Sealed this

Seventeenth Day of September 1985

[SEAL]

Attest:

DONALD J. QUIGG

Attesting Officer

Commissioner of Patents and
Trademarks—Designate